United States Patent [19]

Tarpley

[11] Patent Number: 5,030,255
[45] Date of Patent: Jul. 9, 1991

[54] FLUID SEPARATOR
[75] Inventor: Bret A. Tarpley, Wolfforth, Tex.
[73] Assignee: Texaco Inc., White Plains, N.Y.
[21] Appl. No.: 372,792
[22] Filed: Jun. 29, 1989
[51] Int. Cl.$^5$ .............................................. B01D 19/00
[52] U.S. Cl. ...................................... 55/176; 210/188; 210/519; 210/539
[58] Field of Search ................................. 55/172–177; 210/188, 519, 532.1; 538–540

[56] References Cited

U.S. PATENT DOCUMENTS

| | | | |
|---|---|---|---|
| Re. 19,666 | 8/1935 | McMurray | 55/175 X |
| 1,547,100 | 7/1925 | Daughdrill | 55/176 |
| 2,179,131 | 11/1939 | Millard | 55/172 X |
| 2,342,950 | 2/1944 | Lovelady et al. | 55/175 |
| 2,347,877 | 5/1944 | de Bretteville | 55/172 X |
| 2,659,488 | 11/1953 | Williams | 55/177 X |
| 3,797,203 | 3/1974 | Murdock, Sr. | 55/176 |
| 4,014,791 | 3/1977 | Tuttle | 210/540 X |
| 4,406,789 | 9/1983 | Brignon | 210/532.1 X |

FOREIGN PATENT DOCUMENTS 208601  4/1909  Fed. Rep. of Germany ...... 210/540

Primary Examiner—Robert Spitzer
Attorney, Agent, or Firm—Robert A. Kulason; James J. O'Loughlin; Robert B. Burns

[57] ABSTRACT

An apparatus for the gravitational separation of a hydrocarbon fluid comprised primarily of crude oil, water and varying amounts of gas. A separating tank is provided into which a stream of the hydrocarbon fluid is introduced, and from which tank, discrete flows of crude oil, water and gas respectively are removed.

The tank includes a transversely positioned perforated spreader plate which forms a multiplicity of upwardly flowing streams of the normally lighter crude oil. To assure minimization of turbulence in the upwardly flowing streams, which would deter a complete separation of the fluids, incoming oil/water mixture is introduced to the lower side of the separator plate through a multi-outlet manifold. The manifold includes discharge risers which function to spread the incoming water and oil across the entire lower surface of the spreader plate thereby minimizing the degree of turbulence beneath the plate which might occur.

8 Claims, 2 Drawing Sheets

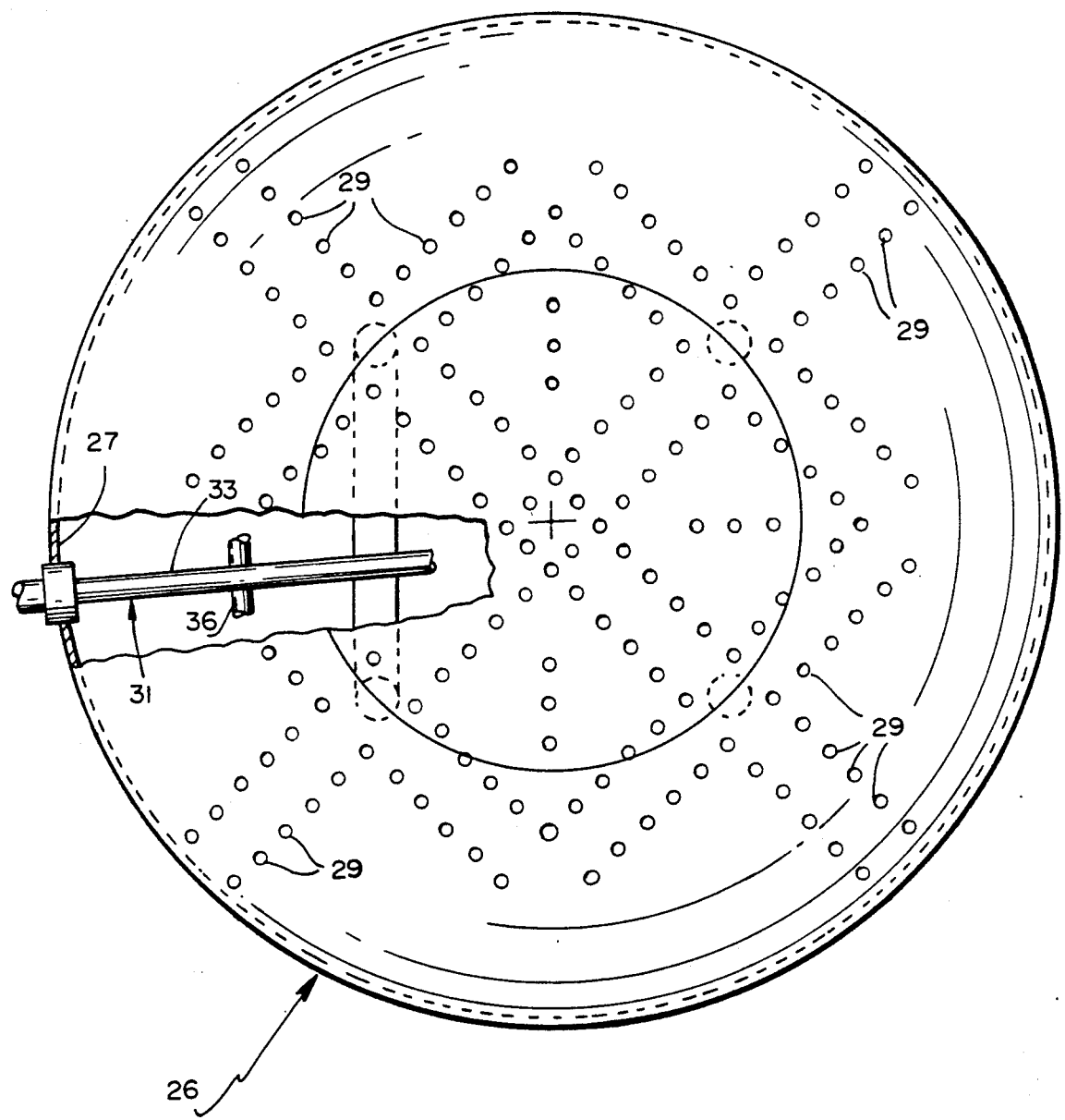

FLUID SEPARATOR

BACKGROUND OF THE INVENTION

In any location or facility where a hydrocarbon liquid such as crude oil is produced from a subterranean reservoir, an amount of water as well as gas will be included in the production flow. As an economic expedient it is desirable to separate these fluids into discrete streams that can be more readily handled downstream.

In the instance of the gaseous components to the produced stream, if the gas is present in a sufficiently large quantity it will be separated from the liquid and accumulated for further use or storage. Where, however, the gas is in a minimal or token quantity, it will be flared off.

In the instance of the water/oil mixture, gravitational separation of the two can be achieved economically. This, however, is done at a relatively slow pace. Functionally, when the combined water/oil mixture is introduced into a common separating, or wash tank, the lighter component will rise to the surface and can be separated from the water. Ideally, this operation is accomplished by maintaining the combined liquids in a relatively quiescent condition; stated otherwise, to minimize or eliminate turbulence in the separating part of the tank.

Toward achieving this ideal separating condition, the water/oil mixture must be introduced to the separating tank in a manner to avoid turbulence at the bottom of the tank. Turbulence is ordinarily caused by a rapidly incoming flow of the mixture from a well. To minimize turbulence, the separating tank is usually provided with a distribution or spreader plate which extends transversely of the tank near its bottom or lower side. The spreader plate functions in one respect to divide the tank into upper and lower segments.

Toward improving the functioning of the perforated spreader plate, and in accordance with the present invention, an incoming oil/water mixture is directed toward the bottom surface of the spreader plate from a plurality of judiciously arranged risers. This arrangement avoids the forceful discharge of incoming produced fluid streams against a limited area of the spreader plate underside, which precludes establishment of a turbulent condition.

BRIEF STATEMENT OF THE INVENTION

In a preferred embodiment, the instant apparatus includes a liquid distribution manifold positioned beneath the spreader plate in a manner to increase the number of upwardly moving oil/water streams which impinge against the plate underside. In effect, the greater the number of said upwardly moving liquid streams, the less will be their turbulence creating capability.

Since the spreader plate is normally provided with a curved or conical configuration, the water and oil mixture will flow along the plate's under surface, and thereafter be guided toward the plate center. During this traverse along the lower surface, the lighter crude oil component along with any entrained gas will rise through the respective perforations and flow upwardly to the tank's oil/water interface.

It is therefore an object of the invention to provide an efficient, liquid separating apparatus, capable of achieving a gravitational separation of a lighter liquid from a heavier one.

A further object is to provide an oil/water separator of the type contemplated wherein a stream of the oil/water mixture is introduced to the lower end of separator tank, and discrete streams of water, oil and gas are removed.

DESCRIPTION OF THE DRAWINGS

FIG. 2 is a cross-sectional view taken along line 2—2 in FIG. 1.

Figure 1:
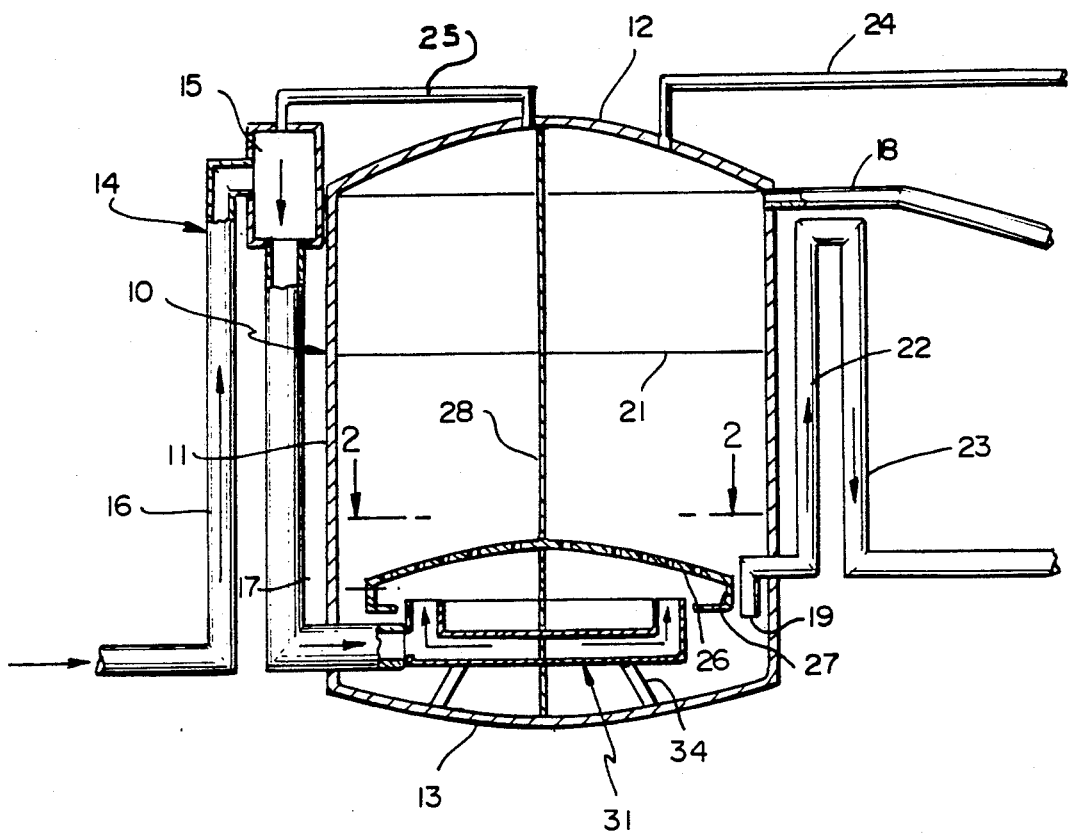
FIG. 1 is a vertical, cross-sectional view of the liquid separating tank.

Referring to the drawings, a liquid separator installation of the type contemplated is shown wherein a primary separating or wash tank 10 is formed preferably comprised of a cylindrical shell 11. Top and bottom closures 12 and 13 respectively are provided at opposed ends of the shell to withstand a minimal internal pressure. Tank 10 is disposed in a generally upright position, and of sufficient diameter to allow an expansive liquid surface.

A crude oil/water mixture, together with varying amounts of gas, is introduced to tank 10 by way of a fluid column 14. The latter is comprised of an inlet leg 16, which communicates with a downcomer 17 at a junction 15. Downcomer 17 opens into the lower side of tank 10 at a separable coupling 20. As the oil/water mixture is delivered to the tank from a well or the like under a slight pressure head, incoming leg 16 will conduct the stream to junction 15 at the upper end of the tank 10, before directing it into downcomer conduit 17. The latter, as noted, communicates with or empties into the tank's lower end. Junction 15 will receive gas from the stream and conduct it by way of conduit 25 into the upper end of tank 10.

In a normal liquid gravitational separation of the type contemplated, the combined water/oil mixture will, as the oil rises to the surface, form an interface 21 in the tank. A discharge conduit 18 at the tank upper end conducts oil from the tank. Positioning the inlet to conduit 18 will maintain the crude oil surface at a desired height within tank 10.

The water component of the liquid mixture is removed from tank 10 at a water discharge outlet 19. The latter communicates with a riser leg 22 together with a downcomer 23, the intersection thereof being connected at an elevation approximating the elevation of oil discharge port 18.

In discharge or downcomer leg 23, a stream of water can be conducted for reuse by injection into the substrate. The gaseous component as noted will be discharged through vent 24.

Referring to FIGS. 1 and 2, a spreader plate 26 is disposed transversely of the flow passage in tank 10. Said plate is rigidly supported by a plurality of peripheral brackets and/or, as shown, by a central support column 28. Plate 26 is preferably shaped to form a raised central portion; it thus can assume a generally conical configuration. Preferably it is contoured to define a concave, perforated area which is bordered by a downwardly extending peripheral rim 27.

Plate 26, as a practical matter, is constructed of a heavy metal such as steel, of sufficient thickness ($\frac{1}{4}$" to $\frac{1}{2}$") to withstand the operating conditions normally encountered in an apparatus of this type. Plate 26 is further provided with a series of through passages or perforations 29 which are disposed in a dispersed pattern to substantially encompass the plate's surface. Operationally, the size of the flow passages or perforations 29 is within the range of about ⅛ inch to ¾ inch. They thereby form a series of upwardly flowing, crude oil miniature streams.

The main incoming oil/water stream will normally be discharged into tank 10 beneath plate 26 in a large, rapidly flowing stream. However, the many perforations 29 through plate 26 will serve to break up the main flow into the smaller streams. This arrangement will promote wide distribution of the liquid, to avoid formation of turbulence conditions at the plate's underside.

To further distribute the initial incoming oil/water flow into smaller segments, a manifold 31 is fixedly positioned adjacent the lower end of tank 10 and beneath perforated plate 26. Manifold 31 includes an inlet 32 which is communicated with incoming oil/water stream by way of coupling 20.

In one embodiment, manifold 31 includes a central or main conductor 33 which can be supported from the tank floor by one or more brackets 34 such that the manifold is firmly positioned immediately below plate 26. Manifold 31 further includes a plurality of sub-conduits or branches 36 which communicate with, and extend outwardly from the main conductor 32 to receive reduced volume streams of the incoming oil/water liquid therefrom.

Figure 3:
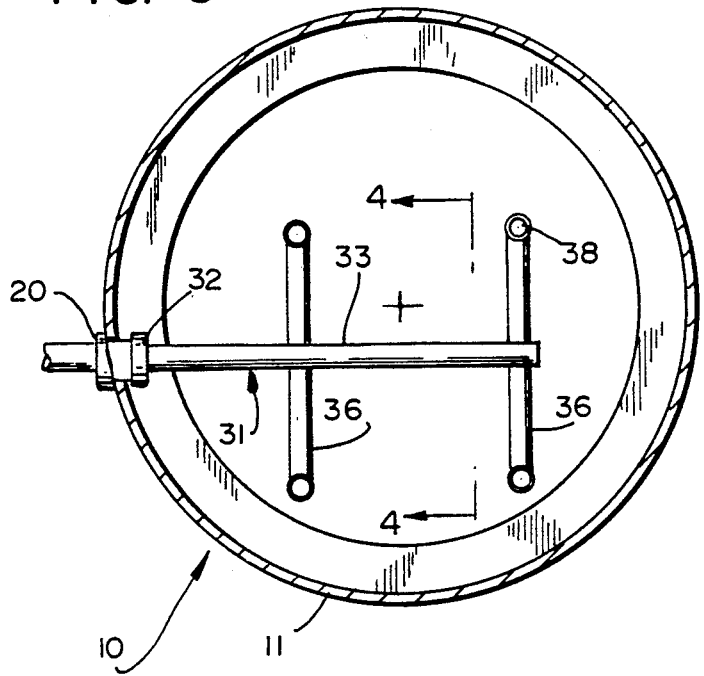
FIG. 3 is a cross-sectional view taken along line 3—3 of FIG. 1
Figure 4:
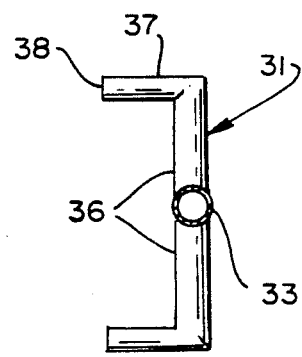
FIG. 4 is an end view of FIG. 3.

As shown in FIGS. 3 and 4, each sub-conduit 36 includes at least one upstanding manifold riser 37, and which terminates in a discharge port 38. The respective riser discharge ports 38 are spaced downwardly from plate 26 underside a desired distance to avoid ejecting a pressurized oil/water stream directly against plate 26 surface. Such a condition would prompt undesired turbulence of the liquid at the plate underside.

Under ideal operating conditions, the oil/water jet flows emerging from the respective discharge ports 38, will initially mix with water in tank 10 lower compartment. The main flow of water from this compartment will thus exit through discharge outlet 19. However, the oil component, together with traces of water, will rise and pass through perforations 31 to enter the upper section of tank 10.

As the wide spread, upwardly flowing streams of oil pass through the upper water holding section of tank 10, they will tend to maintain a generally quiescent atmosphere within said body of water. Thereafter the oil will encounter interface 21 to increase the height of the accumulated oil to the point where it will overflow into the oil discharge conductor 18. From the latter, the now separated, substantially water-free oil will be directed to the next producing stage or merely conducted to a storage means prior to further processing or to being pipelined.

It is understood that although modifications and variations of the invention can be made without departing from the spirit and scope thereof, only such limitations should be imposed as are indicated in the appended claims.

I claim:

1. In an apparatus for the gravitational separation of a hydrocarbon fluid comprised of crude oil, water and gas, into discrete streams,
    a separating tank, including means forming a flow passage, having at least one fluid inlet means communicated therewith for introducing a stream of said hydrocarbon fluid into the separating tank,
    outlet ports communicated with said tank for conducting said discrete streams of crude oil, water and gas, respectively from said tank, and
    a perforated spreader plate having an underside, and being disposed transversely of said means forming said separating tank flow passage, defining upper and lower sections therein, and having perforations through the plate's thickness,
    the improvement in said apparatus of a manifold positioned in said lower section beneath said perforated spreader plate, having an inlet port adapted for communication with said at least one fluid inlet means for conducting said stream of hydrocarbon fluid into said lower section,
    a plurality of spaced apart manifold riser tubes communicated with said manifold for directing dispersed flows of said hydrocarbon fluid against said perforated spreader plate underside, whereby to introduce non-turbulent, upwardly rising streams of fluid into said tank's upper section.

2. In the apparatus as defined in claim 1, wherein said perforated spreader plate extends substantially across said tank's means forming said flow passage.

3. In the apparatus as defined in claim 2, wherein said perforated spreader plate is characterized by a non-planar member having a raised central portion defining a concave segment across at least a portion of the plate's underside.

4. In the apparatus as defined in claim 2, wherein said perforated spreader plate is contoured with a substantially uniform curvature to define a concave underside.

5. In the apparatus as defined in claim 2, wherein said spreader plate perforations are spaced across the plate's entire surface.

6. In the apparatus as defined in claim 1, wherein said plurality of spaced apart manifold riser tubes extending from said manifold are spaced substantially equally apart.

7. In the apparatus as defined in claim 1, wherein said plurality of spaced apart riser tubes communicated with said manifold are spaced equally from said spreader plate center.

8. In the apparatus as defined in claim 1, wherein said perforated spreader plate is substantially circular in configuration, having a vertical central axis, and said plurality of manifold riser tubes are spaced equally from the separator plate central axis.

* * * * *